United States Patent [19]
Duey et al.

[11] Patent Number: 5,148,232
[45] Date of Patent: Sep. 15, 1992

[54] LASER APPARATUS AND METHOD FOR ALIGNING A CRANKPIN GRINDING MACHINE

[75] Inventors: David H. Duey, Westland; John A. Battista, Northville, both of Mich.

[73] Assignee: Intra Corporation, Westland, Mich.

[21] Appl. No.: 646,407

[22] Filed: Jan. 28, 1991

[51] Int. Cl.$^5$ .................. G01B 11/26; G01C 1/00
[52] U.S. Cl. ................... 356/152; 51/165.72; 51/165.74; 356/153; 408/13; 409/147; 409/245
[58] Field of Search ............. 51/165.72, 165.74; 409/147, 245; 356/152, 153; 408/13

[56] References Cited

U.S. PATENT DOCUMENTS

| | | | |
|---|---|---|---|
| 3,551,057 | 12/1970 | Hamilton et al. | 356/153 |
| 3,558,231 | 1/1971 | Bakel | 356/152 |
| 4,566,226 | 1/1986 | Kimura | 51/165.72 |
| 4,712,953 | 12/1987 | Witzel et al. | 356/153 |

Primary Examiner—Stephen C. Buczinski
Attorney, Agent, or Firm—Alex Rhodes

[57] ABSTRACT

An apparatus and method for aligning a crankpin grinding machine of the type having a pair of opposite facing workheads for mounting a crankshaft on its end journals and rotating the crankshaft about an axis passing through selected crankpins during the grinding of the selected crankpins and an indexing device in one of said workheads for indexing the crankshaft about the axis of the end journals to position and grind other selected crankpins. The apparatus is comprised of a laser for projecting a narrow collimated beam of light, a photoelectric target to intercept the target and produce an output which is indicative of where the laser beam intersects the target, an input-output unit to process the output of the target and display information to an operator; and special adapters to mount the laser and target on the crankpin grinding machine to align the workheads, workholders and indexing device of the machine. The method comprises a sequence of steps for mounting and revolving the laser and target and re-positioning the workheads, workholders and indexing device of the machine.

13 Claims, 2 Drawing Sheets

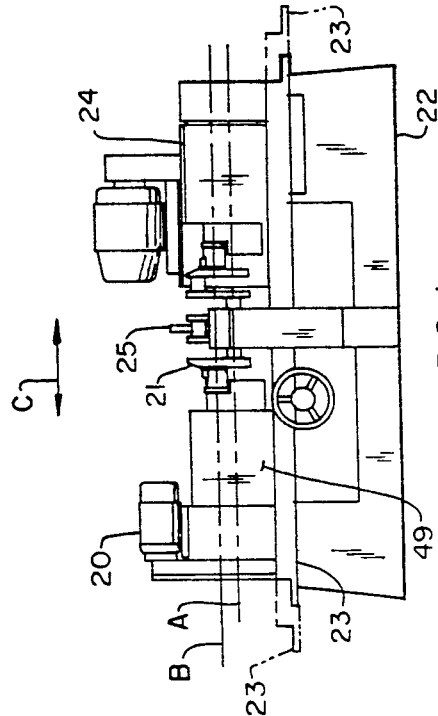
FIG. 1
CRANKPIN GRINDING MACHINE
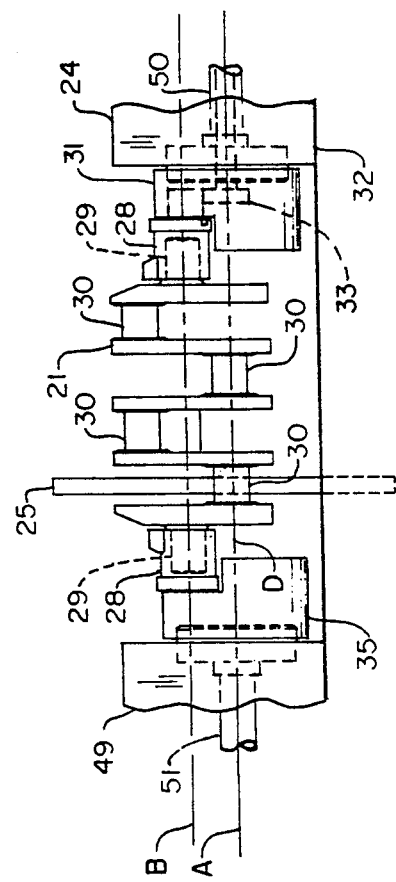
FIG. 2
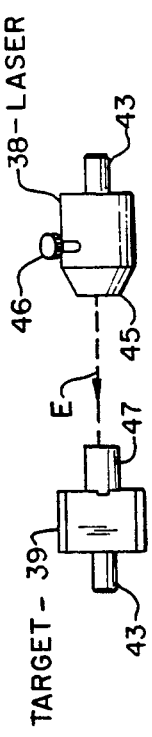
FIG. 3
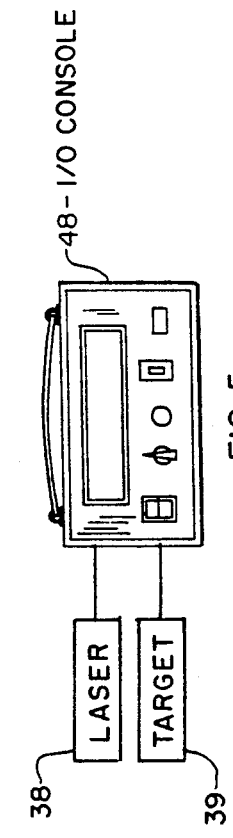
FIG. 4
FIG. 5
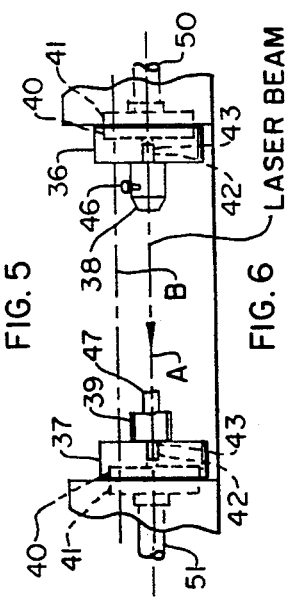
FIG. 6
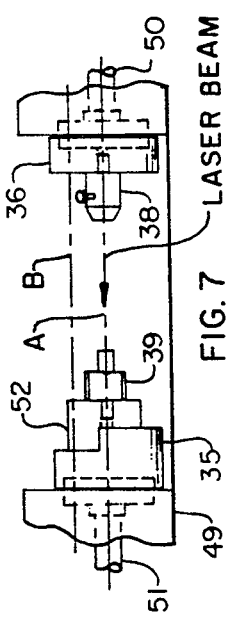
FIG. 7

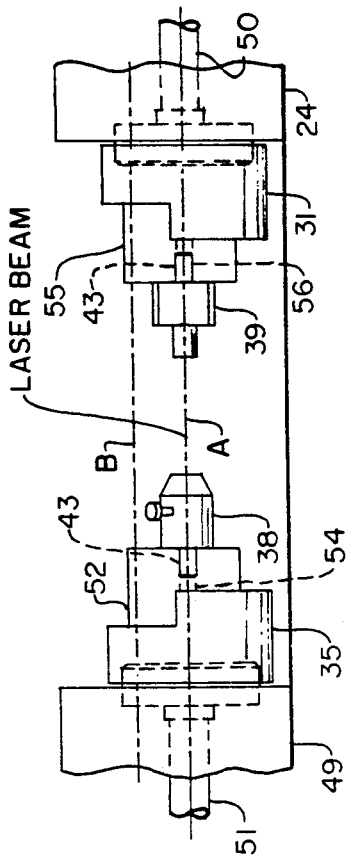
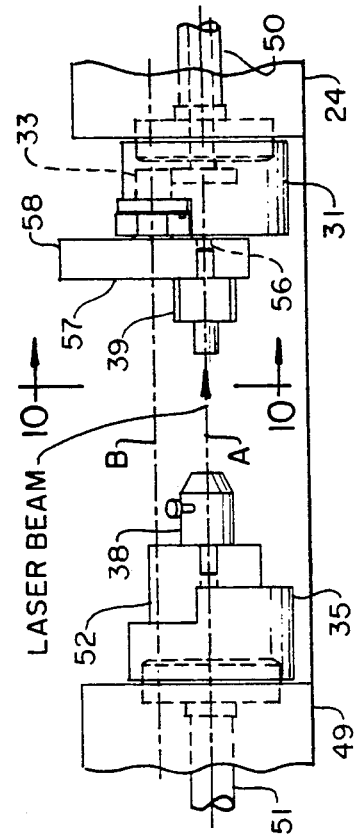
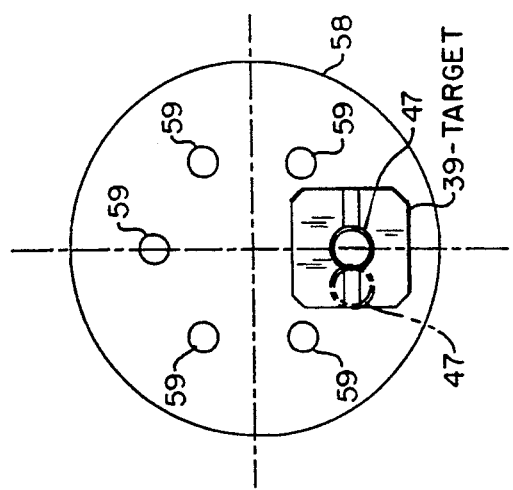
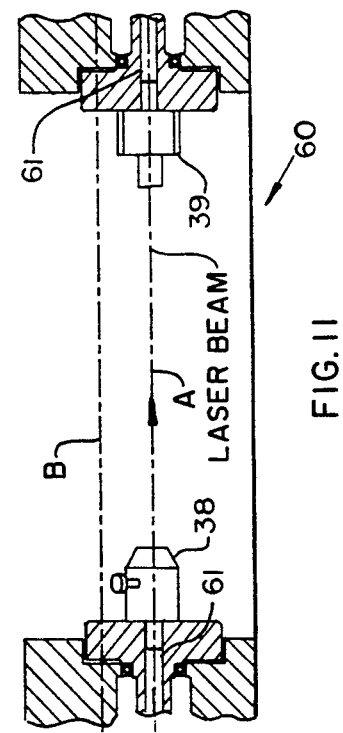

LASER APPARATUS AND METHOD FOR ALIGNING A CRANKPIN GRINDING MACHINE

BACKGROUND OF THE INVENTION

This invention relates to machine alignment and more particularly to an apparatus and method for aligning a crankpin grinding machine. The accurate alignment of a crankpin grinder is an essential step in manufacturing quality engine and compressor crankshafts. Improperly ground crankpins can adversely affect the durability and operation of engines and compressors.

Inasmuch as crankpins are offset from crankshaft end bearings, complex machines with indexing devices and oscillating worktables are required for grinding crankpins. The production of true, round, and properly positioned crankpins is a difficult task and requires the precision alignment of workheads, workholders and indexing devices of these machines. Heretofore, it has not been desirable to align crankpin grinding machines on a regularly scheduled basis, but rather on an "as needed" basis, i.e. when crankpins have deviated from specified tolerances. The reason for this is that the alignment procedures have been difficult and time consuming. This practice has resulted in lost production and added costs of improperly ground crankshafts.

In view of the foregoing, it is apparent that there is a need for an improved apparatus and method for aligning a crankpin grinding machine.

SUMMARY OF THE INVENTION

The present invention is an apparatus and method for aligning a crankpin grinding machine of the type having a pair of opposite facing workheads for mounting a crankshaft on its end journals and rotating the crankshaft about an axis passing through selected crankpins during the grinding of the selected crankpins and an indexing device in one of said workheads for indexing the crankshaft about the axis of the end journals to position and grind other selected crankpins. One benefit of the invention is that the time and costs for alignment are reduced. The reduced alignment time provides an opportunity to perform regularly scheduled maintenance during idle time rather than "as needed". Another benefit is that accuracy of machine alignment is improved. The improved accuracy improves crankshaft quality, reduces scrap and reduces the frequency of machine alignment.

The apparatus is comprised of a laser for projecting a narrow collimated beam of light, a photoelectric target to intercept the target and produce an output which is indicative of where the laser beam intersects the target, an input/output unit to process the output of the target and display information to an operator; and special adapters to mount the laser and target on the crankpin grinding machine to align the workheads, workholders and indexing device of the machine. The method comprises a sequence of steps for mounting and revolving the laser and target and re-positioning the workheads, workholders and indexing device of the machine.

The foregoing features and benefits, together with additional features and benefits will become more apparent from the ensuing description and drawings which describe the invention in detail. A preferred embodiment is disclosed and the subject matter in which exclusive property rights are claimed is set forth in each of the numbered claims at the conclusion of the detailed description.

BRIEF DESCRIPTION OF THE DRAWINGS

FIG. 1 is an operator's side view of a typical crankpin grinding machine with a crankshaft mounted in the machine.

FIG. 2 is an enlarged fragmentary view of FIG. 1.

FIG. 3 is a side view of a laser target assembly.

FIG. 4 is a side view of a laser emitter.

FIG. 5 is a front view of an Input/Output (I/0) console which processes signals from the target and displays the results to an operator.

FIG. 6 is an enlarged fragmentary side view of the machine showing the set-up for aligning the workheads of the crankpin grinding machine.

FIG. 7 is an enlarged fragmentary side view of the machine showing the set-up for aligning one of the workheads with a workholder of the machine.

FIG. 8 is an enlarged fragmentary side view of the machine showing the set-up for aligning the workholder of FIG. 7 with a second workholder of the machine.

FIG. 9 is an enlarged fragmentary side view of the machine showing the set-up for aligning an indexing alignment unit of the machine with the second workholder.

FIG. 10 is a cross-sectional view drawn to an enlarged scale and taken on the line 10—10 in FIG. 9.

FIG. 11 is an enlarged fragmentary side view of an alternate embodiment.

DETAILED DESCRIPTION OF THE PREFERRED EMBODIMENT

Referring now to the drawings, wherein like numerals designate like and corresponding parts throughout the several views, a crankpin grinding machine, for purpose of illustrating the invention, is shown in FIGS. 1 and 2 with a 4-cylinder engine crankshaft 21 mounted in the machine 20. The machine is generally designated by the numeral 20 and includes a base 22, a work table 23 mounted on the base 22, a pair of workheads 24, 49 mounted at opposite ends of the work table 23, a grinding wheel 25, and a pair of workholders 31, 35 mounted on the workheads 24, 49.

The workheads 24, 49 are at opposite ends of the table 23 and each has a horizontal spindle 50, 51 which is mounted for rotation about a common axis, designated by the letter "A". The workholders 31, 35 are fixedly mounted to the ends of the spindles 50, 51 and rotate with the spindles 50, 51 about the axis "A". Each workholder 31, 35 includes a chuck 28 or some other clamping device which is adapted to hold an end journal 29 of the crankshaft 21. The spacing between the axis "A" and the centerline of the crankshaft end journals 29 "B" is the same as the radial distance between the crankshaft end journals 29 and the crankpins 30, commonly referred to as the crankshaft "throw". The 4-cylinder crankshaft 21, shown for purpose of illustration, has two pair of crankpins 30, spaced 180 degrees apart.

The chuck 28 of the workholder 31 which is mounted on the right side workhead 24 includes an indexing device 33 for rotating the crankshaft 21 about the end journals 29 to position selected pairs of crankpins 30 on the workhead spindle axis "A". The axis of rotation of the indexing unit 33 is coincident with the centerline "B" of the crankshaft end journals 29.

The worktable 23 is movable, in a direction parallel to the workhead spindle axis "A", to position selected crankpins 30 opposite the grinding wheel 25. The direction of movement of the worktable 23 on the base 22 is indicated in FIG. 1 by the arrow "C" and the ends of the table 23 at extremes of table travel are shown in phantom in FIG. 1.

During the grinding of a crankpin 30, the crankshaft 21 revolves about the crankpin centerline "D" which is coincident with the spindle axis "A". The diameter and shoulders of the crankpin 30 are finished ground by straight-plunge grinding wherein up to 0.060 and 0.015 inches are removed from the crankpin's diameters and shoulders, respectively, as the crankshaft 21 rotates about the spindle axis "A". After a selected crankpin 30 has been ground, the worktable 23 is moved in the direction of arrow "C" to position another crankpin 30 opposite the grinding wheel 25.

After a pair of crankpins 30, on a common centerline, have been ground, the crankshaft 21 is indexed about the axis "B" to position the remaining pair of crankpins 30 on the spindle axis "A". For crankshafts having more than two pair of crankpins, by way of example, 6 and 8-cylinder crankshafts, the process is repeated until all of the crankpins 30 have been ground.

The first step of our method for aligning the machine 20 is to align the workheads 24, 49 so that the axes of the workhead spindles 50, 51 are aligned, i.e. are on a common axis "A". The set-up for accomplishing this step is shown in FIG. 6. As shown in FIG. 6, the left side 35 and right side 31 workholders have been removed from the ends of the workhead spindles 50, 51 and special adapters 36, 37 have been fixedly mounted on the ends of the spindles 50, 51. The adapters 36, 37 are generally cylindrical members and are designed to mount a laser 38 and a target 39 on the axes of the spindles 50, 51. In each adapter 36, 37, there is a cylindrical bore 40 which closely fits a cylindrical pilot 41 at the end of a spindle 50, 51 and an aperture 42 for receiving a cylindrical mounting stud 43 of the laser 38 or the target 39. The adapters 36, 37 depicted in FIG. 6 are identical, however, dimensional differences in spindle 50, 51, laser 38 or target 39 mountings may require unique adapters. After the adapters 36, 37 have been mounted on the spindles 50, 51, the laser 38 is installed in the right side adapter 36 and the target is installed in the left side adapter 37.

The laser 38 and target 39, shown in FIGS. 3 and 4, are components of the QUADRA BEAM machine alignment system of the Intra Corporation, Westland, Mich. The laser 38 is a low power semi-conductor laser 38 which projects a highly collimated, coherent beam of monochromatic light onto the target 39. The laser beam is depicted in the drawings by the letter "E". Both the laser 38 and target 39 have equal diameter cylindrical mounting studs 43 which closely fit the apertures 42 of the adapters 36, 37. On the housing 45 of the laser 38 are external adjusting screws 46 for adjusting the angle of the beam with respect to the axis of the cylindrical mounting stud 43. This is a desirable feature to compensate for inaccuracies in the structure which mounts the laser 38 to a machine or other device which is to be aligned.

The target 39 includes an internal lateral displacement quadrant photodetector (not shown) which is centered in the target 39 and an external telescope 47. Referring to FIG. 10, the telescope 47 is selectively movable from the center of the target 39, in the path of a laser beam, to an off-center position shown in phantom which is out of the path of the beam. The target 39 is electrically connected to an I/0 console 48. When the beam strikes the target 39, voltages are generated that are supplied to the I/0 console 48 where they are processed and displayed in alpha-numeric form on the I/0 console 48. Step-by-step instructions are also displayed on the I/0 console 48 to guide an operator through the alignment process. Although the QUADRA BEAM system has been used to describe our invention, it is not our intention to limit the scope of our invention to the QUADRA BEAM system.

After the laser 38 has been installed in the right side adapter 36 and the target 39 in the left side adapter 37, the spindle 51 of the left side workhead 49 is aligned with the spindle 50 of the right side workhead 24 by the following procedure.

The telescope 47 is positioned on the center of the target 39 in the path of the laser beam. The right side spindle 50 and laser 38 are then rotated one half turn to measure the angular deviation of the laser beam from the rotational axis of the right side spindle 50. The results (i.e. detector output voltages) are fed into the I/0 console 48 where they are automatically processed to compute and visually display the angular deviation of the beam from the axis of the right side spindle 50 on the I/0 console 48 in terms of horizontal ("H") and vertical ("V") components. The laser 38 and spindle 39 are rotated back to their initial position and the laser beam is aligned to be parallel to the axis of the right side spindle 50 by adjusting the external adjusting screws 46 to zero the "H" and "V" readings on the I/0 console 48.

After the laser beam has been angularly aligned to be parallel with the axis of the right side spindle 50, the telescope 47 is moved away from the center of the target 39, out of the path of the laser beam. The laser 38 and spindle 50 are next rotated one half turn to determine the position of the axis of the right side spindle 50 with respect to the center of the target 39. The output of the target 39 is fed into the I/0 console 48 where it is processed and stored and the laser 38 and spindle 50 are rotated back to their initial position.

With the telescope 47 still positioned away from the center of the target 39, out of the path of the laser beam, the target 39 and left side adapter 37 are rotated one-half turn to determine the position of the axis of the left side spindle 51 with respect to the laser 38. The output of the target 39 is fed into the I/0 console 48 where it is processed and stored and the target 39 and spindle 51 are returned to their initial position.

The telescope 47 is then moved to the center of the target 39 and the target 39 and left side adapter 37 are rotated one-half turn to measure the angular misalignment of the rotational axis of the left side spindle 51 with the rotational axis of the right side spindle 50. The results are fed into the I/0 console 48 where they are processed and the angular misalignment of the axis of the left side spindle 51 with the axis of the right side spindle 50 is displayed on the I/0 console 48 in terms of horizontal ("H") and vertical ("V") components. The left side spindle 51 is then aligned to be parallel with the right side spindle 50 by adjusting (generally by shimming) either the left 49 or right 24 side workheads to zero the "H" and "V" readings on the I/0 console 48.

The telescope 47 is then moved out of the path of the laser beam to determine the position of the center of the target 39 with respect to the laser 38. The results are fed to the I/0 console where they are automatically processed to display on the I/0 console 48 the offset of the axis of the right side spindle 50 from the axis of the left side spindle 51 in terms of "H" and "V" components. The axes of the left side spindle 51 and the right side spindle 50 are then laterally aligned to position both axis on the common axis "A" by re-positioning (generally by shimming) either the left 49 or right 24 side workheads to zero the readings on the I/0 console 48.

The next step is to align the left side workholder 35 with the spindle axis "A". The spindle adapter 37 is removed from the left side spindle 51, and the left side workholder 35, minus the chuck 28, is mounted on the left side spindle 51. A third special adapter 52 is mounted on the left side workholder 35 having an aperture 54 for receiving the cylindrical stud 43 of the target 39. The target 39 is mounted in the third adapter 52 and the telescope 47 is moved to the center of the target 39 in the path of the laser beam. With the left side spindle 51 fixed against rotation, the target 39 is rotated one-half turn to determine the angular deviation of the left side workholder 35 from axis "A". The results are fed into the I/0 console 48 to compute and display the "H" and "V" components of the angular misalignment of the workholder 35 from the axis "A".

The left hand workholder 35 is then angularly adjusted (generally by shimming) to angularly align the workholder 35 with the axis "A" by zeroing the readings on the I/0 console 48. The telescope 47 is then moved away from the center of the target 39, out of the path of the laser beam, and the target 39 is returned to its initial position. Without further rotation of the target 39, the vertical and horizontal offsets of the workholder are computed and displayed in terms of "H" and "V" components on the I/0 console 48 and the workholder 35 is centered on the spindle axis "A" by adjusting the workholder 35 to zero the readings on the console 48.

The next step is to align the right side workholder 31 with the spindle axis "A". The set-up for accomplishing this step is shown in FIG. 8. The target 39 is removed from the left side workholder adapter 35 and replaced with the laser 38. The right side spindle adapter 36 is removed and in its place the right side workholder 31, minus the chuck 28, and a fourth special adapter 55 is mounted on the right side workholder 31. The fourth adapter 55 has an aperture 56 for receiving the cylindrical stud 43 of the target 39.

With the right side spindle 50 fixed against rotation, and the telescope 47 centered on the target 39, the target 39 is rotated one-half turn to determine the angular deviation of the right side workholder 31 from axis "A". The results are fed into the I/0 console 48 wherein the angular deviation of the right side workholder 31 from the axis "A" is computed and displayed in terms of "H" and "V" components. The right side workholder 31 is then angularly adjusted (generally by shimming) to angularly align the workholder 31 with the axis "A" by zeroing the readings on the I/0 console 48. The telescope 47 is then moved out of the path of the laser beam. Without further rotation of the target 39, the vertical and horizontal offsets of the target are displayed in terms of "H" and "V" components on the I/0 console 48 and the workholder is centered on the spindle axis "A" by adjusting the workholder 31 to zero the readings on the console 48.

The final step is to align the indexing unit 33 about axis "B". This is accomplished as follows. The fourth adapter 55 is removed from the right side workholder 31 and a special fifth adapter 57 is mounted on the right side workholder 31. The fifth adapter 57 includes a cylindrical plate 58 which is mounted for rotation about the axis "B" and has a series of apertures 59 for mounting the target 39. The apertures 59 are radially spaced from the axis "B" by the same amount as the crankpins 30 are spaced from the end journals 29. The plate 58 is operatively connected to the indexing unit whereby the plate 58 can be indexed to position each of the apertures 59 on the spindle axis "A". The target 39 is mounted in one of the apertures 59 and the indexing unit is indexed to place the target on axis "A".

With the telescope 47 off center, out of the path of the laser beam, the results are fed into the I/0 console 48 to compute and display the radial offset of the target 39 from axis "A" on the I/0 console 48. The indexing unit 33 is then adjusted to position the target 39 on the axis "A" by zeroing the reading on the I/0 console 48. As a final step, the accuracy of the indexing unit 33 is inspected by repositioning the target 39 in an aperture 180 degrees from its initial position, indexing the plate by the same amount to move the target in line with the axis "A", rotating the target 180 degrees with the telescope 39 off center, and computing and displaying in the I/0 console 48 the angular deviation of the target 39 from the axis "A".

With reference to FIG. 11, in the alternate embodiment 60 shown therein, the special adapters 36, 37 have been eliminated by providing apertures 61 in the left 51 and right 50 side spindles for mounting the laser 38 and target 39. We have shown this embodiment to illustrate that the alignment apparatus can be further simplified by modifications to a crankpin grinding machine 20.

From the foregoing, it is apparent that our invention reduces the time and cost for aligning a crankpin grinding machine 20 as well as improving the machine's alignment.

While our invention has been described in conjunction with specific embodiments, it is evident that many alternatives, modifications, and variations by mere substitutions or changes in material, shape, number, arrangement of parts and sequence of steps, will be apparent to those skilled in the art in light of the foregoing description. Accordingly, it is intended to embrace all such alternatives, modifications, and variations as may fall within the spirit and broad scope of the claims which are appended hereto.

We claim:

1. An apparatus (for aligning a crankpin grinding machine of the type having a pair of opposite facing workheads 24, 49 for mounting a crankshaft 21 between said workheads on its end journals and rotating the crankshaft about an axis A passing through selected crankpins during the grinding of the selected crankpins and an indexing device 33 in one of said workheads for indexing the crankshaft about the axis of the end journals to position and grind other selected crankpins), comprising: a laser 38, projecting a narrow collimated beam of light E onto a target, a target 39 intercepting said laser beam, said target producing output signals which are indicative of the position of said laser beam on said target; a first adapter 36 for mounting said laser on the axis of a spindle of a first workhead of a crankpin grinding machine; a second adapter 37 for mounting said target on the axis of a spindle of a second workhead which is opposite said first workhead to intercept said laser beam when said laser is mounted in said first adapter mounted on said first workhead to align said spindles; a third adapter for mounting said target on a first workholder mounted on said second workhead to intercept said laser beam when said laser is mounted in said first adapter mounted on said first workhead to align said first workholder with said spindle of said first workhead; a fourth adapter for mounting said target on a second workholder mounted on said first workhead to intercept said laser beam when said laser is mounted in said third adapter mounted on said second workhead to align said first workholder with said second workholder; a fifth adapter for mounting said target on said second workholder, said fifth adapter being rotatable about an axis which is offset from said spindles to intercept said laser beam when said laser is mounted in said third adapter mounted on said first workholder to align an indexing unit of said second workholder with said first workholder; and a means 48 operatively connected to said target for processing said output of said target to enable an operator to perform said alignments of said machine.

2. An apparatus (for aligning a crankpin grinding machine of the type having a pair of opposite facing workheads for mounting a crankshaft between said workheads on its end journals and rotating the crankshaft about an axis passing through selected crankpins during the grinding of the selected crankpins and an indexing device in one of said workheads for indexing the crankshaft about the axis of the end journals to position and grind other selected crankpins), comprising: a laser, said laser projecting a narrow collimated beam of light onto a target, a target intercepting said laser beam, said target producing output signals which are indicative of the position of said laser beam on said target; a means for mounting said laser on the axis of a spindle of a first workhead of a crankpin grinding machine; a means for mounting said target on the axis of a spindle of a second workhead which is opposite said first workhead to intercept said laser beam when said laser is mounted on said axis of said spindle of said first workhead to align said spindles; a means for mounting said target on a first workholder mounted on said second workhead to intercept said laser beam when said laser is mounted on said axis of said spindle of said first workhead to align said first workholder with said spindle of said first workhead; a means for mounting said target on a second workholder mounted on said first workhead to intercept said laser beam when said laser is mounted on the said axis of said spindle of said second workhead to align said first workholder with said second workholder; an adapter for mounting said target on said second workholder, said adapter being rotatable about an axis which is offset from said spindles to intercept said laser beam when said laser is mounted on said first workholder to align an indexing unit of said second workholder with said first workholder; and a means operatively connected to said target for processing said output of said target to enable an operator to perform said alignments of said machine.

3. The apparatus for aligning a crankpin grinding machine recited in claim 2 further comprising said laser having a means for angularly aligning said laser beam with said means for mounting said laser on said axis of said spindle of said first workhead.

4. The apparatus for aligning a crankpin grinding machine recited in claim 3 wherein said means for angularly aligning said laser beam with said means for mounting said laser on said axis of said spindle of said first workhead comprises a telescope, said telescope being movable from the center of said target in the path of said laser beam to a position away from the center of said target out of the path of said laser beam.

5. The apparatus for aligning a crankpin grinding machine recited in claim 2 further comprising a means for visually displaying said processed output of said means operatively connected to said target.

6. The apparatus for aligning a crankpin grinding machine recited in claim 2 wherein said means for mounting said laser on said axis of said spindle of said first workhead comprises said first spindle having an aperture on said axis for mounting said laser.

7. The apparatus for aligning a crankpin grinding machine recited in claim 2 wherein said means for mounting said target on said axis of said spindle of said second workhead comprises said second spindle having an aperture on said axis for mounting said target.

8. The apparatus for aligning a crankpin grinding machine recited in claim 2 wherein said means for mounting said laser on said axis of said spindle of said first workhead comprises said laser having a cylindrical mounting stud and an adapter mounted on said spindle, said adapter having an aperture for receiving said cylindrical stud.

9. The apparatus for aligning a crankpin grinding machine recited in claim 2 wherein said means for mounting said target on said axis of said spindle of said first workhead comprises said target having a cylindrical mounting stud and an adapter mounted on said spindle, said adapter having an aperture for receiving said cylindrical stud.

10. A method for aligning a crankpin grinding machine of the type having a pair of opposite facing workheads for mounting a crankshaft between said workheads on its end journals and rotating the crankshaft about an axis passing through selected crankpins during the grinding of the selected crankpins and an indexing device in one of said workheads for indexing the crankshaft about the axis of the end journals to position and grind other selected crankpins, comprising the steps of: mounting a laser on a spindle of a first workhead of a crankpin grinding machine, said laser having a means for projecting a narrow collimated beam of light outwardly, a mounting means, and a means for angularly adjusting said beam with respect to said mounting means; projecting said narrow collimated laser beam in the direction of a spindle of a second workhead; mounting a target on the axis of said spindle of said second workhead to intersect said laser beam, said target being responsive to said laser beam to produce output signals which are indicative of where said laser beam intersects said target; rotating said laser and said first workhead spindle to determine the angular misalignment of said laser beam with respect to the axis of said first workhead spindle; returning said laser and spindle to their initial position; adjusting said laser beam in accordance with the output signals of said target to be parallel to the axis of said first workhead spindle; rotating said laser and said first workhead spindle to determine the position of said first workhead spindle with respect to target from the output signals of said target; returning said laser to its initial position; rotating said target and said second workhead spindle to determine the lateral position of said second workhead spindle with respect to said laser from the output signals of said target; returning said target to its initial position; determining the lateral position of the laser with respect to said target from the output signals of said target at the initial positions of said laser and said target; laterally aligning said workhead axes by re-positioning one of said workheads in accordance with the output signals of said target.

11. The method for aligning a crankpin grinding machine recited in claim 10 further comprising the steps of: removing said target from said second workhead spindle; mounting a workholder on said second workhead spindle; mounting said target on said workholder; rotating said target with said second workhead spindle held stationary to determine the angular misalignment of said workholder with said second workhead spindle axis; aligning said workholder to be parallel with said second workhead spindle axis by re-positioning said workholder on said workhead; returning said target to its initial position; determining the lateral position of the workholder with respect to first workhead spindle from the output signals of said target at the initial positions of said laser and said workholder; and laterally aligning said workhead with said first workhead spindle by re-positioning said workholder on said workhead in accordance with the output signals of said target.

12. The method for aligning a crankpin grinding machine recited in claim 10 further comprising the steps of: removing said target from said first workholder; removing said laser from said first workhead spindle; mounting said laser on said first workholder mounted on said second workhead spindle; mounting a second workholder on said first workhead spindle; mounting said target on said second workholder; rotating said target with said first workhead spindle held stationary to determine the angular misalignment of said second workholder with said first workhead spindle axis; aligning said second workholder to be parallel with said first workhead spindle axis by re-positioning said second workholder on said first workhead spindle; returning said target to its initial position; determining the lateral position of said second workholder with respect to said other workholder from the output signals of said target at the initial positions of said workholders; and laterally aligning said workholders by re-positioning said second workholder on said first workhead in accordance with the output signals of said target.

13. The method for aligning a crankpin grinding machine recited in claim 10 further comprising the steps of: removing said target from said second workholder; mounting an adapter on said second workholder, said adapter being rotatable about an axis which is offset from the axis of said first workhead spindle; mounting said target in said adapter; rotating said adapter a predetermined amount to measure the error of an indexing device of said second workholder; eliminating said angular error by adjusting said adapter in accordance with the output signals of said target.

* * * * *

UNITED STATES PATENT AND TRADEMARK OFFICE
CERTIFICATE OF CORRECTION

PATENT NO. : 5,148,232
DATED : Sept. 15, 1992
INVENTOR(S) : David H. Duey and John A. Battista It is certified that error appears in the above-identified patent and that said Letters Patent is hereby corrected as shown below:

IN THE CLAIMS:

Column 6, line 48, after apparatus, delete "(";
Column 6, line 50, after workheads, delete "24,49" and after crankshaft, delete "21";
Column 6, line 52, after axis, delete "A";
Column 6, line 54, after device, delete "33";
Column 6, line 56, after crankpins, delete ")"
Column 6, line 57, after laser, delete "38" and insert --said laser--;
Column 6, line 58, after light, delete "E" and after target, delete "39";
Column 6, line 61, after adapter, delete "36";
Column 6, line 63, after adapter, delete "37";
Column 7, line 16, after means, delete "48";
Column 7, line 20, after apparatus, delete "(";
Column 7, line 28, after crankpins, delete ")";

Signed and Sealed this

Twenty-third Day of November, 1993

Attest:

Attesting Officer

BRUCE LEHMAN

Commissioner of Patents and Trademarks